United States Patent [19]

Winzer

[11] 4,452,507

[45] Jun. 5, 1984

[54] FIBER OPTICAL BYPASS SWITCH

[75] Inventor: Gerhard Winzer, Munich, Fed. Rep. of Germany

[73] Assignee: Siemens Aktiengesellschaft, Berlin and Munich, Fed. Rep. of Germany

[21] Appl. No.: 303,097

[22] Filed: Sep. 17, 1981

[30] Foreign Application Priority Data

Sep. 30, 1980 [DE] Fed. Rep. of Germany ....... 3036950

[51] Int. Cl.³ ............................................... G02B 7/26
[52] U.S. Cl. ............................... 350/96.20; 350/96.16
[58] Field of Search ............... 350/96.15, 96.16, 96.20, 350/96.21

[56] References Cited

U.S. PATENT DOCUMENTS

| 4,023,886 | 5/1977 | Nakayama et al. | 350/96.21 |
| 4,146,856 | 3/1979 | Jaeschke | 335/151 |
| 4,148,558 | 4/1979 | Schuck | 350/96.20 |
| 4,152,043 | 5/1979 | Albanese | 350/96.20 |
| 4,170,731 | 10/1979 | Howell et al. | 250/227 |
| 4,189,206 | 2/1980 | Terai et al. | 350/96.20 |
| 4,193,662 | 3/1980 | Hara | 350/96.15 |
| 4,204,744 | 5/1980 | Wittmann | 350/96.20 |
| 4,303,302 | 12/1981 | Ramsey et al. | 350/96.20 |
| 4,318,587 | 3/1982 | Grassl | 350/96.20 |
| 4,337,995 | 7/1982 | Tanaka et al. | 350/96.20 |

FOREIGN PATENT DOCUMENTS

| 2531398 | 7/1976 | Fed. Rep. of Germany | 350/96.20 |
| 2903878 | 8/1980 | Fed. Rep. of Germany | 350/96.20 |
| 2412084 | 7/1979 | France | 350/96.20 |
| 1426475 | 2/1976 | United Kingdom | 350/96.15 |
| 2030319 | 4/1980 | United Kingdom | 350/96.20 |

OTHER PUBLICATIONS

E. Rawson et al., "A Fiber Optical Relay for Bypassing Computer Network Repeaters", *Optical Engineering*, vol. 19, No. 4, Jul./Aug. 1980, pp. 628–629.

D. Kendall, "On Etching Very Narrow Grooves in Silicon", *Applied Physics Letters*, vol. 26, No. 4, Feb. 15, 1975, pp. 195–198.

Leighton, "Fiber Optic Shutter", *IBM Tech. Discl. Bulletin*, vol. 11, No. 8, Jan. 1969, pp. 912–913.

Hale et al., "Mechanical Optical-Fibre Switch", *Electronics Letters*, vol. 12, No. 15, Jul. 1976, p. 388.

Ohmori et al., "Optical Fiber Switch Driven by PZT Bimorph", *Applied Optics*, vol. 17, No. 22, Nov. 1978, pp. 3531–3532.

Crow, "Fiber-Optic Switch", *IBM Tech. Discl. Bulletin*, vol. 21, No. 11, Apr. 1979, p. 4686.

Aoki et al., "Paired Optical-Fiber Switch for Optical Data Bus Systems", *Optics Letters*, vol. 4, No. 11, Nov. 1979, pp. 346–347.

*Primary Examiner*—John D. Lee
*Attorney, Agent, or Firm*—Hill, Van Santen, Steadman & Simpson

[57] ABSTRACT

A fiber optical bypass switch or relay for selectively connecting incoming and outgoing line fibers to a pair of subscriber fibers extending to a subscriber station and bypassing the subscriber station by interconnecting the line fibers together characterized by a housing having a pair of stops, an arrangement for holding at least two fibers including at least one line fiber on a plane in a movable part which is mounted for movement in the housing between the pair of stops in a contact-free manner, an arrangement for holding the remaining fibers in the housing in the desired position relative to the pair of stops and a mechanism for moving the part between the pair of stops including a biasing arrangement for urging the part in one direction between the stops so that while the part is engaged on the first of the pair of stops, the line fibers are interconnected with the subscriber fibers being bypassed and when the part is in contact with the other stop, the incoming and outgoing line fibers are connected to the subscriber fibers.

13 Claims, 14 Drawing Figures

FIBER OPTICAL BYPASS SWITCH

BACKGROUND OF THE INVENTION

1. Field of the Invention

The present invention is directed to a fiber optical bypass relay or switch for selectively connecting an incoming line fiber and an outgoing line fiber to a pair of subscriber fibers extending to a subscriber station and bypassing the subscriber station by interconnecting the incoming line fiber to the outgoing line fiber which switch has movement of a single part which is biased against one stop and is then moved to another stop.

In a fiber optical communication system with a ring network structure, a plurality of subscriber stations are connected in series with the line fiber for receiving the communication signal. If a repeater has been turned off at the subscriber station or if the repeater is malfunctioning, it is desirable that this particular station be bypassed and thus a fiber optical bypass switch or bridge is provided in the ring network or structure for each station to enable bypassing each station.

A fiber optical bypass relay or switch for bypassing a repeater or station in a fiber optical communication system is disclosed by E.G. Rawson et al, "A Fiber Optical Relay for Bypassing Computer Network Repeaters", *Optical Engineering,* Vol. 19, No. 4, July/August 1980, pages 628–9. This fiber optical bypass relay is an opto-mechanical relay which exhibits only one movable part. The incoming line fiber from the fiber optical path and the subscriber fiber incoming from the repeater or station to the optical bypass relay are fixed to this movable part which consists of a ferro-magnetic material. The outgoing line fiber which extends to the fiber optical path and a subscriber fiber which leads to the repeater or subscriber station are secured on a stationary plate or lamina. The movable part is moved back and forth between two positions or stops by means of a magnetic coil and an additional spring arrangement. When the moving part rests at one of the two stops, the repeater or subscriber station is bypassed because the incoming line fiber is connected to the outgoing line fiber. When the moving part is moved against the other stop, then the repeater is incorporated in the fiber optical communication path because the incoming line fiber is connected to the subscriber fiber leading to the subscriber station and the outgoing line fiber is connected to the subscriber fiber extending from the subscriber station. A disadvantage of this known fiber optical bypass relay is the motion of the moving part between the two positions does not occur in a contact-free manner, but on the contrary, the moving part slides over a substrate during this motion. This sliding of the moving part across the substrate causes wear between the moving part and the substrate which limits the useful life of the fiber optical bypass relay and the sliding also increases the required power for operating the switch or the making and breaking capacity of the switch.

SUMMARY OF THE INVENTION

The present invention is directed to a fiber optical bypass relay or switch in which incoming and outgoing line fibers are selectively connected to the subscriber fibers for the subscriber station and are connected together to bypass the subscriber station. The bypass switch or relay has a high operational reliability, has a simple structure, and requires a low making and breaking capacity.

To accomplish these objects, the fiber optical bypass switch comprises a housing with spaced first and second stops; means holding at least two fibers including at least one line fiber in a plane on a movable part in said housing; means for mounting the remaining fibers in said housing in a desired position relative to the stops; said movable part being mounted in said housing so that an end of the part is movable between the pair of stops in a contact-free manner; and means for moving the part between said pair of stops, said means for moving including means for biasing the part in one direction between said stops so that while the part is engaged on the first stop, the line fibers are interconnected together with the subscriber fibers being bypassed and when the part is engaged on the second stop, the incoming line fiber and the outgoing line fiber are connected to the subscriber fibers.

In one embodiment of the switch, the ends of the two fibers lie in a moving plane and are held in a metal part which can move contact free by means of a magnetic field from the first stop or detent to the second stop or detent due to changes in the magnetic field. In this embodiment, the metal part is secured to a free end of an armature tongue which is mounted with the free end movable between the stops and which supports the fibers held in the metal part. The armature tongue and the metal part of the forementioned optical bypass relay can be a single component. For changing the magnetic field, a magnetic coil is expediently provided and the magnetic coil, the armature tongue and one of the two stops or detents are designed as an electro-magnetic relay or reed switch.

In a further development of the switch, the ends of the two fibers, which are not disposed in the moving plane, are supported on a member forming the stop or detent which is not a part of the electro-magnetic relay. Thus, the fiber ends can be cemented along the entire length of a surface of the members or can be secured in some other manner. But at least a sufficient number of fastening points or support points are provided so that the fibers can no longer execute any considerable vibration on the members.

Commercially available electro-magnetic relays can be utilized for the construction of the switch in accordance with the present invention without an electrical circuit being placed on the switch tongues so that the armature and the stops are not electrically loaded by a current flow. Such an electrical load is only provided in those cases in which an electrical contact is to be opened and/or respectively closed at the same time as the optical connection. In general, the armature tongue and stops only serve to support the fiber ends which are to be optically connected or coupled together. Thus the fiber ends are secured in such a manner that the fiber ends are aligned to lie opposite one another at a small distance with their terminating surfaces being plane parallel for the two final positions of the relay or switch.

The transfer of the light wave between the ends of the fiber optical waveguides is largely loss-free when the fiber optical waveguides have plane parallel terminating surfaces and are opposite one another at a slight distance in such a manner that one fiber end lies in the line of sight of the other fiber end and so that the one fiber practically represents an extension of the other fiber. The optical connection or coupling between the two fiber ends is interrupted because the one fiber end is moved out of alignment with the other fiber end.

Upon employment of an electro-magnetic relay, this motion is achieved by the armature and the fiber ends secured thereto being moved from one stop or position to the other stop or position in response to the application of the external magnetic field. Advantageously, electro-magnetic relays can be constructed according to the principle of a so-called reed contact; however, the protective atmosphere can be eliminated when the contacts are not being electrically loaded.

In reed relays, the armature tongue and the stops are designed as contact tongues consisting of magnetic material. Frequently, the one contact tongue which forms the stop or detent is rigid and the other contact tongue is a spring like strip which is chucked or secured at one end and can be moved by the magnetic field opposite its restoring force. The two contact tongues are arranged to the core of the magnetic coil in such a manner that the springs are magnetized due to the magnetic flux during excitation of the magnetic coil and strike against one another so that the one switch position is achieved. On deenergizing of the magnetic coil, the movable spring end is biased away from the rigid spring and comes into engagement with a stop or detent at the other switch position.

When utilizing such a reed relay, the movable contact tongue is the metal part which can be moved by the magnetic field and which is secured at one end by means of a singleslided chucking of a contact tongue. Insofar as special spring characteristics are desired and if these special characteristics cannot be achieved by a magnetizable material, it can be advantageous to manufacture the armature tongue of a different material and to only manufacture a separate member as a magnetizable metal part which is influenced by the magnetic field and is secured on the free end of the tongue. It can also be advantageous under certain conditions not to chuck the armature but for example to seat it by means of a joint.

In another embodiment of the switch, the ends of the two fibers lying in the moving plane can be held by an electrically controllable piezo-electrical flex strip which is moved from one of the two stops or detents to the other of the two stops or detents during switching by means of changing the voltage applied to the electrical coatings or electrodes on the piezo-electrical flexed strip. A PLZT elastic ceramic strip (PLZT abbr. for lead-lanthanum-circonate-titanate) can for example be employed as such a piezo-electrical flex strip. The PLZT elastic strip can consist of a plurality of piezo-laminae in a sandwich arrangement. Control voltages, which can be very low, are applied via corresponding electrodes or metal layers on each of the individual laminae to cause the strip to bend from a rest position to the other position.

Advantageously, the ends of the fibers are fixed in guidance grooves on their supports which may be the armature tongue, the metal part, the piezo-electrical flex strip, or if need be the stops or detents. Given mass production, these guidance grooves are advantageously formed in a thick layer or film of photosensitive material by a photolithographical process.

In a sample embodiment of the invention, the fiber optical bypass relay is designed in such a manner that the ends of both the incoming and outgoing line fibers are disposed on the movable part in a plane which extends perpendicular to the direction of movement of the part. The means for mounting the remaining fibers mounts a pair of ends of a loop fibers in a first plane which is a continuation of the plane of the part when the part engages the first stop and also mounts the pair of ends of the subscriber fibers in a second plane which is a continuation of the plane of the part as the part engages the second stop. Thus when the part engages the first stop, the end faces of the line fibers will be coupled to the end faces of the fiber loop which will interconnect the incoming and outgoing line fibers and when the part engages the second stop, the end faces of the line fibers will be coupled to the end faces of the additional fibers which extend to the subscriber station or the repeater. Advantageously, the position in which the end faces of the line fibers are interconnected by the fiber loop will be a position obtained for a current-free state for the fiber optical bypass relay or switch.

In another sample embodiment of the fiber optical bypass relay or switch, the means for holding the fibers on the movable part positions a line and subscriber fiber in a plane extending parallel to the direction of movement of the part, the means for mounting positions a line fiber and subscriber fiber in the same plane between said stops with the line and subscriber fiber being arranged in a particular order. Thus when the part engages the first stop, the line fibers are coupled together and when the part engages the second stop, the line fiber of the part is coupled to the subscriber fiber mounted on the housing and the subscriber fiber mounted on the part is coupled to the line fiber mounted in the housing. In this sample embodiment, the switch position, which has the incoming line fiber directly coupled to the outgoing line fiber is preferably a position which is obtained with a current-free condition of the relay.

In the above mentioned sample embodiment, an additional fiber loop can be added. Thus, when the relay or switch is in a condition with the incoming line fiber connected to the outgoing line fiber to bypass the subscriber station which may include a repeater, light which is being conducted in an incoming subscriber fiber from the repeater will be coupled into the loop which in turn will couple it to the outgoing subscriber fiber for the repeater so that light coming from the repeater will be returned to the repeater via the fiber loop. To accomplish this, one fiber end of the fiber loop is disposed as a third fiber on the movable part in a location so that when the movable part is in a position against the second stop with the fiber end face of the incoming line fiber coupled to the subscriber fiber leading to the repeater and the fiber end face of the subscriber fiber coming from the repeater being coupled to the outgoing line fiber, the ends of the loop are not coupled to any other fiber. However, when the movable part moves to a second position against the first stop wherein the incoming line fiber is coupled to the outgoing line fiber, then the one end of the loop fiber on the movable part will be coupled to the end of the subscriber fiber leading to the repeater and the fiber end face of the end of the subscriber fiber coming from the repeater will be connected to the other end of the additional fiber loop which is mounted on the housing.

Expediently, a cover laminae or member will be dimensioned with a slot for securing the pair of the free fiber ends on the moving part or respectively to a fixed part of the switch. Advantageously, the cover laminae or plate is connected to the mover or part before the insertion of the fibers and is then slotted to receive the fibers. The fibers are then subsequently inserted into the slot and cemented therein. Thus the cover member can be thickly or thinly designed. If the member is thinner than the total height of the fibers, the slot can project into a portion of the part or the carrier body and as the case may be if the plate or the cover laminae is removed, the slot can be directly formed in the part. In this case, a short segment of a blank manufactured in this manner can also be used for fastening the fiber ends which are not fixed in the moving plane.

In a development of the switch, a silicon part provided with V-grooves is employed as the cover laminae or plate for securing the fibers. Such grooves can be generated in the silicon part for example by a photolithographic manner by means of a preferential etching such as an anisotropic etching which utilizes a silicon dioxide mask as disclosed by D. L. Kendall, "On Etching Very Narrow Grooves in Silicon", *Applied Physics Letters*, Vol. 26, No. 4, Feb. 15, 1975, pages 195-198.

In all cases, the fiber end faces lying opposite one another in the fiber optical bypass relay or switch are polished or burnished. The burnishing is not carried out until after the fibers have been mounted or built into the blanks of the cover member. The spacing of the fiber axis should be as small as possible. This condition can particularly be met in an ideal fashion and the solution in which a suitable dimension slots are introduced into the cover member or plate which is provided for the fastening of the fiber ends. In this solution, the stroke of the moving plane need only amount to a fiber diameter.

Many methods have been worked out in the meantime for the precise orientation and securing of the fiber ends. For example, guidance grooves provided in a thick photosensitive material either applied as a single layer or a strip of material such as sold under the trademark RISTON; or grooves etched in a silicon member; or groove impressed or cut in a member or grooves formed by means of an ultrasonic burnishing and the like. The particular method of providing the orientation and guidance groove will depend upon the material being utilized.

DESCRIPTION OF THE PREFERRED EMBODIMENTS

Figure 1:
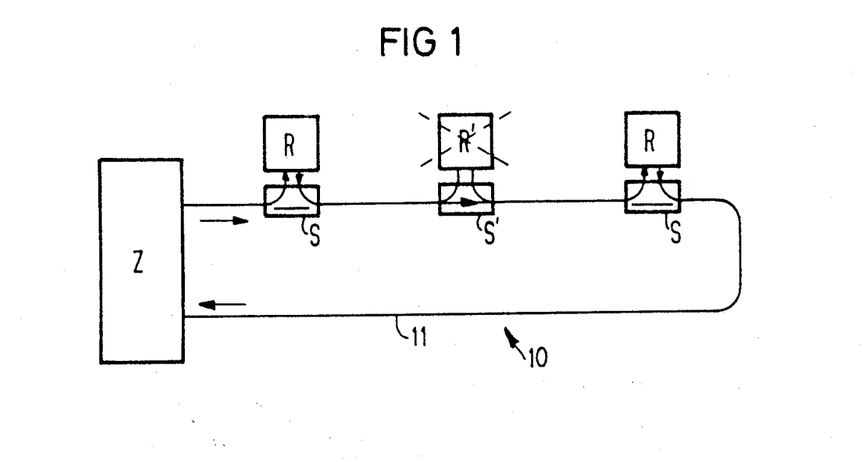
FIG. 1 is a diagrammatic illustration of a communication system utilizing fiber optical bypass relays or switches of the present invention.

The principles of the present invention are particularly useful in a fiber optical bypass relay or switch S which is illustrated in FIG. 1 as being incorporated in a fiber optical communication system 10 with a central station Z and a ring network or structure 11 having a plurality of repeaters R at each subscriber terminal. As illustrated, a fiber optical bypass switch or relay S is associated with each of the subscriber terminals for the purpose of coupling and bypassing the repeater R from the network 11. Thus, when a repeater such as R' has an outage or is turned off, the associated switch S' will bypass the repeater R' from the network and preferably this bypassing is accomplished automatically as discussed hereinafter. The network can be constructed with gradient profile fiber optical waveguides. Since this is a matter of multimode fibers, the fiber optical bypass switch S utilized in the ring network must also be of multimode components.

Figure 2:
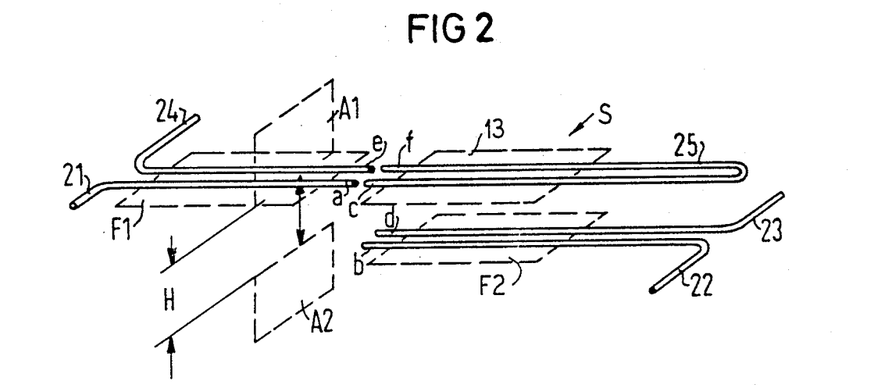
FIG. 2 is a schematic illustration showing the structural principles of a fiber optical bypass relay or switch in accordance with the present invention.

The structural principle of one embodiment of the fiber optical bypass relay or swtich S is best illustrated and described in FIG. 2. A line fiber 21 which is incoming from a transmission path and a line fiber 24 which is outgoing to the transmission path are arranged to lie in a moving plane F1. The end of the fiber 21 has an end face a while the end of the fiber 24 has an end face e and these ends as well as the ends of the remaining fibers to be described are held in the plane F1 by photolithographically formed guidance grooves or in another manner.

The plane F1 is movable via an elastic element, for example a spring and can be moved through a stroke having a distance H between two detents or stops A1 and A2. While the plane F1 is positioned to engage the stop A1 which preferably corresponds to a current free state of the bypass switch or relay, the switch S has the subscriber bypassed because of a bypass fiber loop 25. The fiber loop 25 has two end faces c and f and is mounted in a plane 13 which is an extension of the moving plane F1 when it engages the first stop A1. With the plane F1 on the stop A1, the end face a of the incoming line fiber 21 from the transmission path is coupled to the end face c of the fiber loop 25 and the other end face f is aligned for coupling to the end face e of the outgoing line fiber 24. Thus, while in this position, incoming light signals on the line fiber 21 are coupled into the loop 25 which in turn couples them back into the outgoing line fiber 24.

The switch S in a plane F2 also has a pair of subscriber fibers 22 and 23. The subscriber fiber 22 has an end face b while the subscriber fiber 23 has an end face d. When the moving plane F1 is shifted against the second stop or detent A2, which is reached as a work position, the moving plane F1 will be aligned with the plane F2 and the repeater of the subscriber is incorporated into the transmission path by the end face a of the incoming line fiber 21 being coupled to the end face b, of the subsriber fiber 22 leading to the subscriber and the end face d of a subscriber fiber 23 which is leading from the subscriber will be coupled to the end face e of the outgoing line fiber 24. It is noted that in the actual structure, the fiber ends such as c and f of the fiber loop 25 can be mounted on a cover laminae or plate and together with the plate can be secured to the stop A1. The fiber ends of the fibers 22 and 23 are likewise mounted in a cover plate or laminae and together with the plate are secured to the stop A2. The fibers 21 and 24 which are in the moving plane F1 can be fixed on a movable part with or without additional guide elements. The movable or moving part is preferably a reed contact or a piezo-ceramic flex strip or some other motion stroke element. It should be noted, that the moving plane moves in a direction indicated by the arrow which is perpendicular to the plane.

Figure 3A:
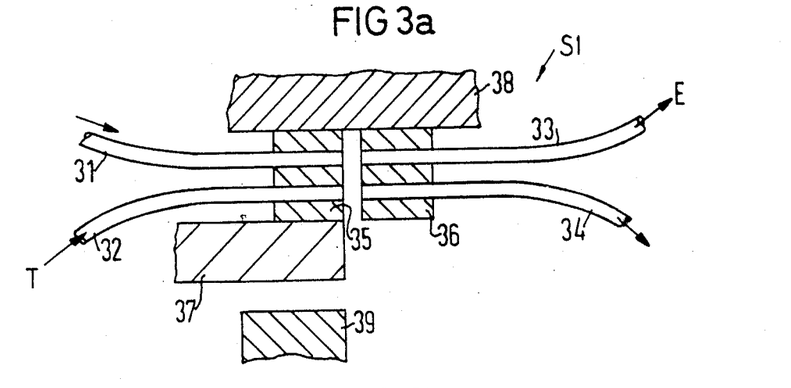
FIGS. 3a and 3b are cross-sectional views with portions in elevation for purposes of illustration of an embodiment of a fiber optical bypass switch or relay with FIG. 3a showing the position of the movable part to couple the repeater or station of the subscriber into the system and FIG. 3b showing the position of the movable part for bypassing the repeater.
Figure 3B:
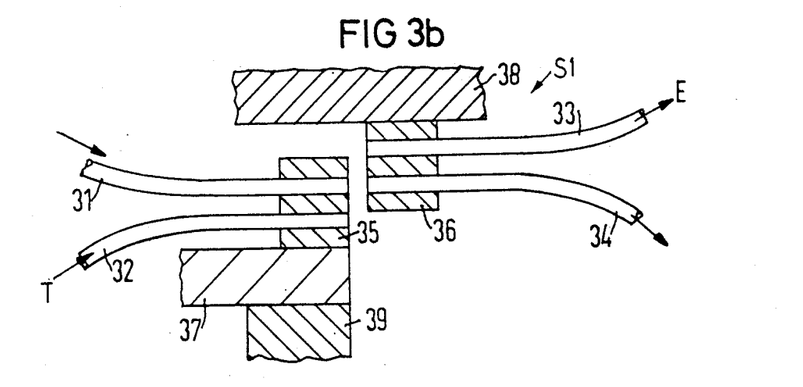

An embodiment of the inventive fiber optical bypass relay or switch is generally indicated at S1 in FIGS. 3a and 3b. In this embodiment, pairs of fibers 31 and 32 are disposed in a guidance element 35 while a second pair of fibers 33 and 34 are disposed in the guidance element 36. The fiber 31 is an incoming line fiber and is connected to a transmission path such as the path 11 of FIG. 1. The fiber 32 is an incoming subscriber fiber for a transmitter T of the subscriber station while the fiber 33 is a subscriber fiber leading to the receiver E at the subscriber station. The fiber 34 is an outgoing line fiber which leads back to the transmission path. In this illustration embodiment, the fibers 31 and 32 are held by the guidance element 35 on a movable part 37 in a plane which is parallel to the direction of motion of the part 37 between the first stop 39 and a second stop 38. The fibers 33 and 34 are held by the guidance element 36 in the same plane adjacent one of the stops such as 38. The movable part or mover 37 moves between a first position engaging a first stop 39 as illustrated in FIG. 3b to a second position with the guidance element 35 engaged on the second stop 38.

A work position for the optical bypass relay S1 is shown in FIG. 3a. Here a subscriber with a receiver E and a transmitter T can be coupled into the transmission path such as the path 11 of FIG. 1. In this work position of the fiber optical bypass relay or switch S1, the fiber end face of the ends of the fibers 31 and 33 are coupled together as are the fiber end faces of the ends of the fibers 32 and 34. In an idle position or first position which is illustrated in FIG. 3b, the subscriber is bypassed because the fiber end face of the incoming line fiber 31 is coupled to the end face of the outgoing line fiber 34. It should be noted that the particular structure of the mover 37 can be either that of a reed contact or a piezo-ceramic flex strip or some other movement element.

Figure 4:
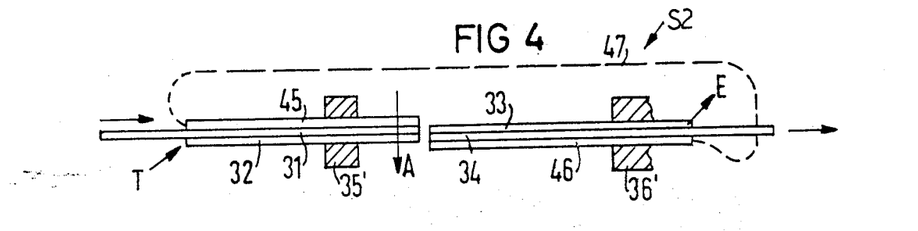
FIG. 4 schematicaly illustrates an embodiment of the fiber optical bypass switch of FIG. 3 with an additional fiber loop.

In FIG. 4, an embodiment of the inventive optical bypass relay or switch is generally indicated at S2 and is very similar to the embodiment S1 with the addition of a fiber loop 47. Due to similarities between the two embodiments, the same element numbers are utilized to identify the same structure. The additional fiber loop 47 makes it possible that the coupling between the line fiber and the subscriber receiver and the subscriber transmitter and the outgoing line fiber can be completely interchanged with the outgoing and incoming line fibers being connected and the subscriber transmitter and receiver being interconnected. Thus, in contrast to the switch S1 of FIG. 3, there are no longer a pair of fibers but rather three fibers which are disposed in the two guidance elements 35' and 36'. In addition, it is noted that unlike the spaced apart ends of the fibers in the embodiment S1, the fibers in each of the guidance elements 35' and 36' are engaged with each other. A fiber end 45 of the loop 47 is secured in the guidance element 35' with the line fiber 31 between the end 45 and subscriber fiber 32 and the other end 46 of the loop 47 is secured on the guidance element 36' with the line fiber 34 between the end 46 and the subscriber fiber 33. The end 45 is positioned so that when the incoming line fiber 31 is coupled to the subscriber fiber 33 leading to the receiver during the work position, the fiber end 45 as well as the fiber end 46 are not coupled to any other fiber. Thus, the additional fiber loop 47 of the fiber optical bypass relay S2 has no function in the work position. However, in the idle position, the subscriber fiber 32 which is incoming from the transmitter will be coupled to the fiber end 46 of the loop 47 and the other end 45 of the loop will be coupled to the subscriber fiber 33 which is outgoing to the subscriber receiver. Thus while the incoming line fiber 31 is coupled to the outgoing line fiber 34 to bypass the subscriber station, any light being released from the transmitter T will be coupled through the end 46 of the loop 47 to the end 45 and into the subscriber fiber 33 extending to the receiver E.

In the embodiment illustrated in FIG. 4, it is noted that the fiber ends such as 45, 31 and 32 are arranged in the holder such as 35' in contact with each other so that the fiber axes of the fibers are disposed next to one another by a spacing A=D wherein D is the outside diameter of the fiber. In this case, the moving part must be displaced or deflected between a work position and idle path by an amount A which equals the distance D or one fiber diameter.

Figure 5A:
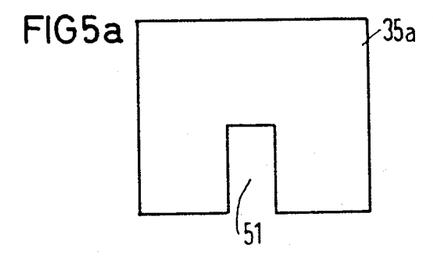
FIGS. 5a-5f show various components or parts for fastening the fiber ends in the fiber optical bypass switch in accordance with the present invention with FIG. 5a showing an individual cover part, FIG. 5b showing the cover part assembled on a movable part, FIG. 5c showing a different arrangement of the securing a cover part on the movable part, FIG. 5d illustrating the fibers mounted in the arrangement of FIG. 5c, FIG. 5e showing a variation of the arrangement of FIG. 5d, and FIG. 5f showing a third embodiment of a cover part or laminae.
Figure 5B:
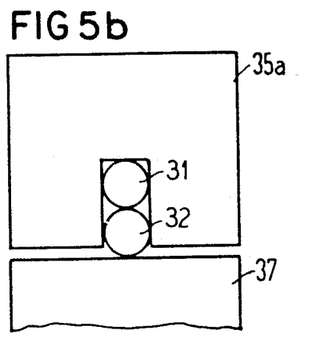
Figure 5C:
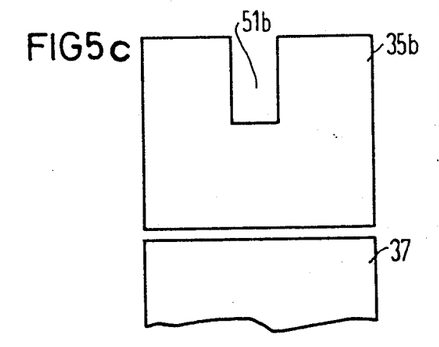

As mentioned hereinabove, the particular mounting of the two or more fibers on the movable part as well as on the stationary part can have different structures. As illustrated in FIG. 5a, a cover laminae or member 35a is provided with a slot 51 which is dimensioned to receive and secure a pair of fibers such as 31 and 32 or respectively three fibers such as 31, 32, and 45. In the arrangement of FIG. 5a, the pair of fibers such as 31 and 32 have their ends secured in the slot 51 and are arranged to be in contact with each other and extend parallel thereto. After the inserting and securing of the fibers in the slot 51 of the cover member or part 35a, the part 35a is secured onto the movable part or mover 37, as illustrated in FIG. 5b.

Figure 5D:
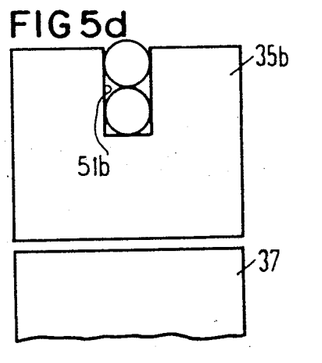
Figures 5E, 5F:
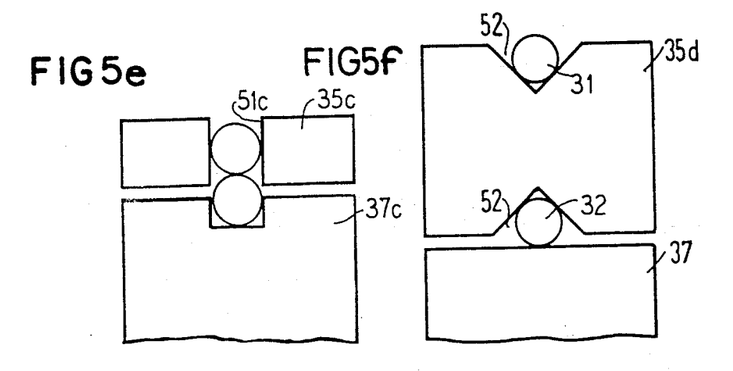

In another sample embodiment of the guidance elements or parts, a cover laminae or part 35b is connected to the moving element 37 and is then provided with the slot 51b. After providing the part 35b with the slot 51b, the fibers are then secured into the part (see FIG. 5d). The slot 51b can project into the moving part 37 as illustrated in FIG. 5e by slot 51c which extends into the surface of the part 37c. If the cover part or laminae 35c has a thickness which is thinner than the two fibers, then a part of the slot 51c will enter the part 37c. Also, it is possible that the cover laminae be completely eliminated so that the entire slot 51c is formed directly into the moving part or mover 37c. It should be noted that a short portion of the unfinished blank 35a or 35b should be retained to be utilized as a component 36.

Another embodiment of the cover laminae or part 35d is illustrated in FIG. 5f and is a silicon part provided with a pair of V-shaped grooves 52, 52. These V-shaped grooves can, for example, be generated by means of anisotropic etching. In this case, a correspondingly produced element can be employed for the component 36.

Figure 6:
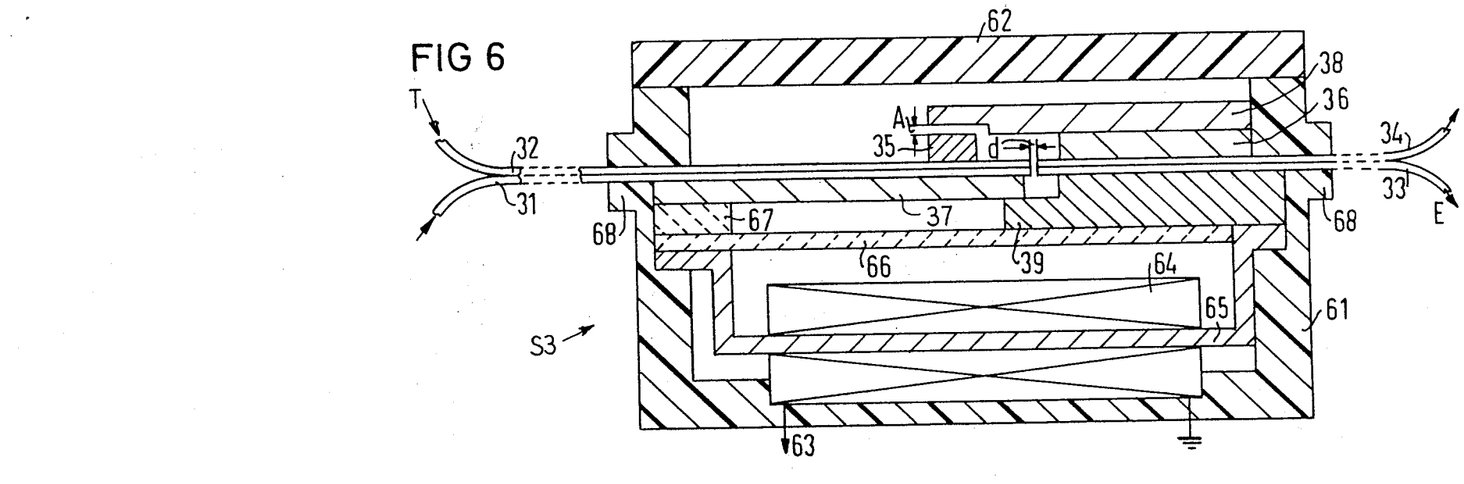
FIG. 6 is a cross-sectional view of a model of a fiber optical bypass switch in accordance with the present invention.

A laboratory model of a fiber optical bypass relay or switch is generally indicated at S3 in FIG. 6. The switch S3 has a housing 61 which advantageously consists of plastic and has an easily attachable dust and water-tight cover 62. The housing 61 contains a magnetic coil 64 which is actuated by a control line 63. The coil 64 carries a nickel-iron core 65 which is connected to a rigid contact tongue forming a second stop 39. Another ferro-magnetic contact tongue or armature tongue 37 which for example can be manufactured of a nickel-iron alloy such as sold under the tradename VAKUVIT is disposed in the area of the magnetic flux of the magnetic coil 64 and its iron core 65. This contact tongue 37 is secured with one end to the housing and the other end is free for movement. With the assistance of a cover laminae or part 35, the incoming line fiber 31 from the outside path and an incoming subscriber fiber 32 from the subscriber transmitter T are fixed parallel and lie one above the other on the tongue 37 in such a manner that their fiber jackets are in contact. With the assistance of a cover laminae or part 36, the subscriber fiber 33 extending to the subscriber receiver E and the outgoing line fiber 34 which is connected to the back transmission path are likewise secured on the rigid contact tongue 39 and are fixed to extend parallel lying one above the other in such a manner that their fiber jackets are in contact. In this case the rigid contact tongue 39 will function as a carrier body for the elements consisting of the cover laminae or part 36 and the two fibers 33 and 34. The stop 38 is spaced or secured on the cover laminae 36 and consists of a non-magnetic material for example brass.

The relay or switch S3 of FIG. 6 is illustrated as being in a work or second position. This is a result of the excitation of the magnetic coil 64 causing the moving contact tongue 37 to be held against the rigid contact tongue 39.

The majority of the parts of the above-described switch particularly the actuated reed contact parts, are components of an easily obtained commercially available reed contact device. An example of such a device is produced by Siemens AG and sold with a designation "SG Gm Contact C 39209-A 26-A 3". In comparison to this commercial reed contact device, it is only the glass envelope and the protective atmosphere filling which are eliminated. Further, in the case of the above mentioned model, the moveable end of the contact tongue 37 is lengthened in order to achieve a greater stroke and the contact tongues are cemented to the glass plate 66 and 67 which form a bridge. Given different shapes for the parts 37 and 38, one can do without the glass plate 66 and 67. Furthermore, the contact tongues can also be located within the coil body. Under certain conditions, either the coil body or the rigid tongue may be designed as either a protective element or a housing.

In the illustrated work or second position of the fiber optical bypass relay, a subscriber with a receiver E and a transmitter T is coupled into the transmission path. The light from the path arrives at the receiver E of the subscriber via a path over the fibers 31 and 33 and light from the transmitter T of the same subscriber is fed back into the path by the fibers 32 and 34. In the example shown, the stroke of the moving contact tongue or movable part 37 amounts to A=D wherein D is the outside diameter of any of the fibers 31-34. In the work position of the bypass switch S3, the cover laminae 35 has a spacing A from the detent or stop 38.

When the magnetic coil 64 is deenergized, the cover laminae 35 is then pressed against the detent or stop 38 due to the return spring power of the moving contact tongue or blade 37. In this idle or first position of the fiber optical bypass switch S3, only the fiber end faces of the fibers 31 and 34 are opposite one another. Thus, the light traveling in the incoming line fiber 31 is immediately coupled into the outgoing line fiber 34 and the subscriber is bypassed. In the illustrated laboratory model forming the switch S3, a spacing d of approximately 10 μm exists between the end faces of fibers 31, 32 and the end faces of fibers 33, 34. The part 37 has a stroke A which corresponds to the outside diameter of the fiber. Gradient index fibers with an outside diameter of 125 μm and a numerical aperture of approximately 0.15 are employed as the fiber optical waveguides. However, the stepped index fibers are also usable. Appropriate plugs 68 are provided for securing the fiber optical bypass switch or relay into the fiber optical communication network. Cross-talk attenuation of the switch amounts to 39.2 dB, while the transmission loss at the distance d amounts to 0.5 dB and the switching time amounts to approximately 20 ms.

Figure 7:
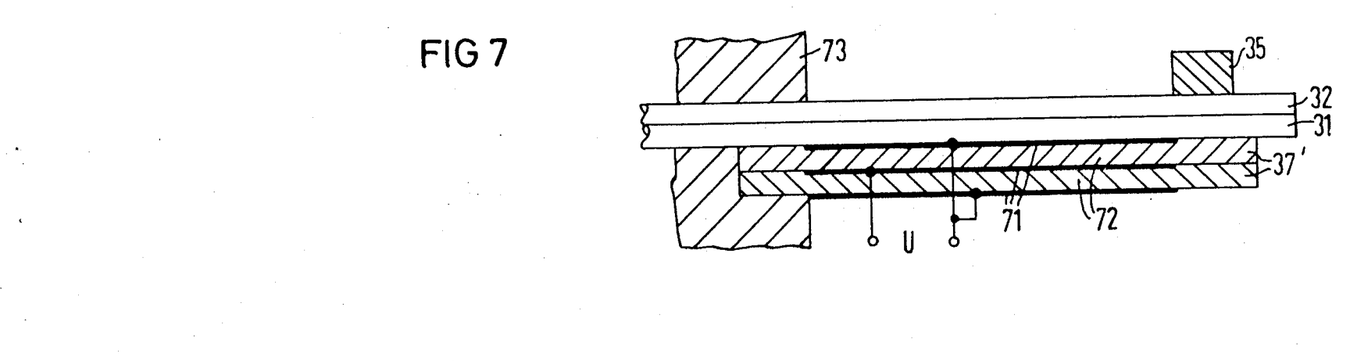
FIG. 7 is a partial view of a portion of a fiber optical bypass relay of the present invention utilizing a flexible ceramic strip.

In FIG. 7, a cross-section of a PLZT elastic ceramic strip 37' with its appropriate electrode or electrical coating arrangement is shown. Such a piezo electric flex strip can be utilized to replace the movable part or armature 37 in the sample embodiment such as illustrated in FIGS. 3 and 4. The strip 37' is illustrated as composing of two piezo laminae or layers 72 which are cemented together. Prior to cementing the layers together, electrode layers or electrical coatings 71 were vapor deposited on these laminae 72 in such a manner that the strip 37' will be deflected or bend in a desired manner, when a controlled voltage U is applied to the electrodes 71. A mover or movable part designed in this manner, can be disposed in a fiber optical bypass relay in such a manner for example that the subscriber is bypassed when the control voltage disappears and the subscriber is coupled in the transmission path when a predetermined maximum DC control voltage is applied to the electrodes 71. Tests have shown that a sufficient deflection of A=120 μm can be achieved even with small operating voltages such as 3 volts when utilizing a piezo-electrical flex strip 37' in an optical fiber bypass relay. The fibers 31 and 32 are secured to the strip 37' by means of a guidance element 35. The mover 37' has one end secured in the support mount 73 and it is noted that no electrodes exist in the area of the support mount. A piezo-electric flex strip with sufficient deflection of A=120 μm could be achieved even given low operating voltages of three volts when the strip is 75 mm long, 15 mm wide and has a PLZT sandwiched flex strip consisting of two laminae 72 each 150 μm thick.

Figure 8:
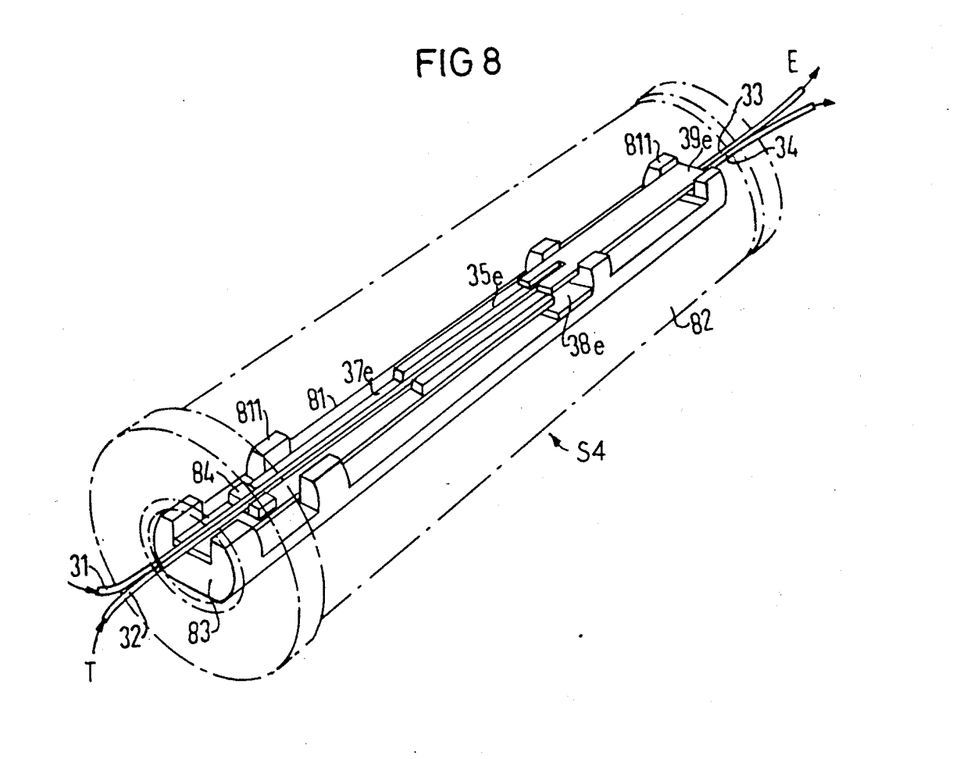
FIG. 8 is another embodiment of a fiber optical bypass switch in accordance with the present invention.

An embodiment of the fiber optical relay bypass or switch is generally indicated at S4 in FIG. 8. The embodiment S4 has a switching unit 81 which is received in the inside of an electrical coil 82 which is indicated in dot-dash lines. The coil 82 serves for actuation of the switching unit 81 by means of magnetization of corresponding parts of the switching unit when an electrical current is applied to the coil. The switching unit 81 exhibits a basic body member 83, which for example consists of an aluminum die casting. The basic body member 83 carries a projecting switch tongue 37e on which the fiber optical waveguides 31 and 32 are secured. The fiber optical waveguides 31 and 32 are disposed and secured on an upper surface of the switching tongue 37e, which faces away from the basic body 83, with the assistance of a guidance element 35e and an additional guidance element 84.

The basic body element 83 also carries a rigid carrier strip 39e which overlaps an end portion of the switching tongue 37e at its free end. The optical fibers 33 and 34 are secured between the carrier strip 39e and the basic body 83 with the assistance of a guidance element which is similar to the element 35e (not visible). The actuation of the switching tongue 37e will occur with the assistance of the electrical coil 82 by means of the magnetizing of the switching tongue 37e and the carrier strip 39e. When this occurs, the end of the elements 35e will strike against the overlapping end of the carrier strip 39e so that the carrier strip 39e forms a stop for the switching tongue 37e. The fiber optical waveguides 31 and 32 as well as the waveguides 33 and 34 are secured in such a manner that the fiber end faces are coupled to one another in this work or second position of the switch in such a manner that the subscriber station is incorporated in the fiber optical communication network. In other words, the incoming line fiber 31 is coupled to the subscriber 33 while the other subscriber fiber 32 is coupled to the outgoing line fiber 34.

The tongue 37e is biased in such a manner that it resiliently lifts off the carrier strip 39e when the electrical coil 82 is switched off. In this idle position of the fiber optical bypass relay S4, the switching tongue 37e will strike against the non-magnetic detent 38e. In this idle position of the switch the subscriber is bypassed and only the fiber end faces of the incoming line fiber 31 is coupled to the outgoing line fiber 34.

The secured ends of the switching element 37e and the carrier strip 39e are held and guided on both longitudinal sides between support noses 811 of the basic body element 83. The positive lock between the basic body element 83 and the switching tongue 37e and strip 39e can be achieved by means of deforming these support noses such as 811.

The elements 35e and 84 which have the guidance groove for supporting the fibers can be provided by photolithographically forming the groove in a thick layer of light sensitive material or can be formed in other manners discussed hereinabove.

In conclusion, it should be noted that the moving plane of the movable part is advantageously pressed against the one detent by an external force which is opposed by a reset force. This reset force may be provided by a spring element or the resilient nature of the switching tongue such as 37, 37' or 37e. The reset force, which is a resilient force will move the tongue against the other detent or stop when the external power such as the electrical magnetic force or an electrical current is not present.

Although various minor modifications may be suggested by those versed in the art, it should be understood that I wish to embody within the scope of the patent granted hereon, all such modifications as reasonably and properly come within the scope of my contribution to the art.

I claim:

1. A fiber optical bypass switch for selectively connecting an incoming line fiber and an outgoing line fiber to a pair of subscriber fibers extending to a subscriber station and bypassing the subscriber station by interconnecting the incoming line fiber to the outgoing line fiber by movement of a single part, said bypass switch comprising a housing having spaced first and second stops; means for holding at least two fibers on a movable part in said housing, said means positioning both line fibers in a fiber plane extending perpendicular to the direction of movement of said movable part, said movable part being mounted in the housing with an end of the part being movable between the stops in a contact-free manner, means for mounting the remaining fibers in the housing in the desired position relative to the stops, said means for mounting the remaining fibers mounts a pair of ends of a fiber loop in a first plane which is a continuation of the fiber plane when the part is engaged on said first stop and mounts the ends of the pair of subscriber fibers in a second plane which is a continuation of the fiber plane when the movable part engages the second stop; and means for moving the part between said stops, said means for movingg including means for biasing the part in one direction between said stops so that while the part is engaged on the first stop, the line fibers are interconnected together by said fiber loop with the subscriber fibers being bypassed and when the part is engaged on the second stop, the incoming and outgoing line fibers are connected to the pair of subscriber fibers.

2. A fiber optical bypass switch according to claim 1, wherein the movable part is a metal part, said means for moving said part includes an armature tongue being mounted in the housing with one end being free to move between the stops, the metal part being secured on the one end and means for creating a magnetic field to move said armature tongue and metal part between said stops.

3. A fiber optical bypass switch according to claim 2, wherein the armature tongue and the metal part are a single component.

4. A fiber optical bypass switch according to claim 3, wherein the means for creating the magnetic field comprises a magnetic coil arranged with the housing so that the magnetic coil, one of the two stops and the armature tongue create an electro-magnetic relay.

5. A fiber optical bypass switch according to claim 4, wherein the ends of the two remaining fibers are supported by the stop which is not part of the electro-magnetic relay.

6. A fiber optical bypass switch according to claim 4, wherein the armature tongue and the stop which is part of the electro-magnetic relay are both contact tongues.

7. A fiber optical bypass switch according to claim 1, wherein the movable part comprises an electrically controllable piezo-electric flex strip having electrical coatings and having one end mounted in the housing, said means for moving the part between said pair of stops including means for applying a voltage to the coatings of the flex strip to cause bending thereof.

8. A fiber optical bypass switch according to claim 1, wherein the means for holding at least two fibers on the movable part and the means for mounting the remaining fibers in the housing comprise means for forming guidance grooves on the respective surfaces of the movable part and a portion of the housing for receiving the ends of the respective fibers.

9. A fiber optical bypass switch according to claim 8, wherein the means for forming the guidance grooves comprises photolithographical formed grooves in a thick layer of a light sensitive material disposed on the surfaces.

10. A fiber optical bypass switch according to claim 1, wherein said means for moving the part between said stops includes electrically actuated means for moving the part from the first stop to the second stop with the biasing means urging the part into engagement with said first stop so that when the switch is in a rest condition without the application of any electrical current, the subscriber station is bypassed.

11. A fiber optical bypass switch according to claim 1, wherein the end faces of each of the fibers of the switch are optically polished.

12. A fiber optical bypass switch for selectively connecting an incoming line fiber and an outgoing line fiber to a pair of subscriber fibers extending to a subscriber station and bypassing the subscriber station by interconnecting the incoming line fiber to the outgoing line fiber by movement of a single part, said bypass switch comprising a housing having spaced first and second stops; a fiber loop having two ends; means for holding three fibers on a movable part in said housing, said means positioning one line fiber, one subscriber fiber and one end the fiber loop in a plane extending parallel to a direction of movement of said part, said movable part being mounted in the housing with an end of the part being movable between the stops in a contact-free manner, means for mounting the three fibers in the housing in the desired position relative to the stops; and means for moving the part between said stops, said means for moving including means for biasing the part in one direction between said stops, and said means for mounting the three fibers in the housing positioning a line fiber, a subscriber fiber and the other end of the fiber loop in the same plane between said stops with the other end of the fiber loop and the line and subscriber fibers being arranged so that when the movable part engages the first stop, the line fibers are connected together with the ends of the fiber loop being coupled to the subscriber fibers to return any light signals contained in the subscriber fibers back to the subscriber station and when the movable part engages the second stop, the line fiber on the movable part is coupled to the subscriber fiber mounted in the housing, the subscriber fiber on the movable part is coupled to the line fiber mounted on the housing and the ends of the fiber loop are not coupled with another fiber.

13. A fiber optical bypass switch according to claim 12, wherein the movable part is a strip mounted to have a free end movable between the positions engaging the stops, said means holding the fibers on said movable part and the means mounting the fibers in said housing each comprising a cover member having an appropriately dimensioned slot for receiving three fibers being secured respectively on the strip and one of said stops.

* * * * *